(12) United States Patent
Batson et al.

(10) Patent No.: US 9,015,276 B2
(45) Date of Patent: *Apr. 21, 2015

(54) DETERMINING PLAYABILITY OF MEDIA FILES WITH MINIMAL DOWNLOADING

(71) Applicant: Apple Inc., Cupertino, CA (US)

(72) Inventors: James D. Batson, Saratoga, FL (US); John Samuel Bushell, San Jose, CA (US); Eric Carlson, Berkeley, CA (US); Jeremy Spencer Jones, Cupertino, CA (US); Roger Pantos, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,742

(22) Filed: Jun. 25, 2013

(65) Prior Publication Data

US 2014/0012952 A1 Jan. 9, 2014

Related U.S. Application Data

(63) Continuation of application No. 12/143,119, filed on Jun. 20, 2008, now Pat. No. 8,489,702.

(60) Provisional application No. 60/936,862, filed on Jun. 22, 2007.

(51) Int. Cl.
*G06F 15/16* (2006.01)
*H04L 29/06* (2006.01)
*G06F 17/30* (2006.01)

(52) U.S. Cl.
CPC .......... *H04L 65/60* (2013.01); *G06F 17/30781* (2013.01); *G06F 17/30017* (2013.01); *G06F 17/30896* (2013.01)

(58) Field of Classification Search
None
See application file for complete search history.

(56) References Cited

U.S. PATENT DOCUMENTS

| | | | | |
|---|---|---|---|---|
| 5,359,469 A | * | 10/1994 | Ueda | 360/53 |
| 5,434,678 A | * | 7/1995 | Abecassis | 386/278 |
| 5,539,586 A | * | 7/1996 | Inoue et al. | 386/248 |
| 5,737,395 A | | 4/1998 | Irribarren | |
| 5,940,391 A | | 8/1999 | Malkin et al. | |
| 6,002,694 A | * | 12/1999 | Yoshizawa et al. | 370/486 |
| 6,101,510 A | | 8/2000 | Stone et al. | |
| 6,138,148 A | | 10/2000 | Lipkin | |
| 6,289,165 B1 | * | 9/2001 | Abecassis | 386/224 |
| 6,389,473 B1 | | 5/2002 | Carmel et al. | |
| 6,421,726 B1 | * | 7/2002 | Kenner et al. | 709/225 |
| 6,477,550 B1 | | 11/2002 | Balasubramaniam et al. | |
| 6,507,727 B1 | | 1/2003 | Henrick | |
| 6,546,417 B1 | | 4/2003 | Baker | |
| 6,662,341 B1 | | 12/2003 | Cooper et al. | |
| 6,785,688 B2 | | 8/2004 | Abajian et al. | |
| 6,912,591 B2 | | 6/2005 | Lash | |
| 6,959,339 B1 | | 10/2005 | Wu et al. | |
| 7,062,686 B2 | * | 6/2006 | Moritomo | 714/52 |

(Continued)

*Primary Examiner* — Ian N Moore
*Assistant Examiner* — Dung B Huynh
(74) *Attorney, Agent, or Firm* — Park, Vaughan, Fleming & Dowler LLP

(57) ABSTRACT

A method is provided through which information about media files embedded in web pages is obtained from a server and analyzed to determine if the media files are playable on a device. This information may be external to the media file or may be a portion of the media file itself. The determination of whether a media file is playable by a device is made based on information obtained from the server without downloading the entirety of the media file.

14 Claims, 4 Drawing Sheets

(56) References Cited

U.S. PATENT DOCUMENTS

| | | | |
|---|---|---|---|
| 7,218,594 B2* | 5/2007 | Van Gestel | 369/59.25 |
| 7,251,277 B2 | 7/2007 | Luken | |
| 7,447,738 B1* | 11/2008 | Andrews et al. | 709/204 |
| 7,562,300 B1 | 7/2009 | Tobias et al. | |
| 7,673,340 B1 | 3/2010 | Cohen et al. | |
| 7,698,392 B2 | 4/2010 | Zapata et al. | |
| 7,792,756 B2 | 9/2010 | Plastina et al. | |
| 7,836,404 B2 | 11/2010 | Dietz et al. | |
| 8,050,542 B2 | 11/2011 | Han | |
| 8,099,445 B1 | 1/2012 | Masinter et al. | |
| 8,489,702 B2* | 7/2013 | Batson et al. | 709/217 |
| 2001/0044848 A1 | 11/2001 | Kikuchi et al. | |
| 2002/0001272 A1* | 1/2002 | Takagi et al. | 369/53.17 |
| 2002/0010740 A1 | 1/2002 | Kikuchi et al. | |
| 2002/0069308 A1 | 6/2002 | Jones et al. | |
| 2002/0082730 A1* | 6/2002 | Capps et al. | 700/94 |
| 2002/0087642 A1 | 7/2002 | Wei et al. | |
| 2002/0097983 A1 | 7/2002 | Wallace et al. | |
| 2002/0103920 A1 | 8/2002 | Berkun et al. | |
| 2002/0120675 A1 | 8/2002 | Everett et al. | |
| 2002/0124100 A1 | 9/2002 | Adams | |
| 2002/0157034 A1 | 10/2002 | Sagar | |
| 2002/0188665 A1 | 12/2002 | Lash | |
| 2003/0014630 A1 | 1/2003 | Spencer et al. | |
| 2003/0021014 A1 | 1/2003 | Barenburg et al. | |
| 2003/0032419 A1* | 2/2003 | Shibasaki et al. | 455/419 |
| 2003/0049029 A1* | 3/2003 | Murakami et al. | 396/429 |
| 2003/0060157 A1 | 3/2003 | Henrick | |
| 2003/0061369 A1 | 3/2003 | Aksu et al. | |
| 2003/0121042 A1 | 6/2003 | Franken et al. | |
| 2003/0149628 A1 | 8/2003 | Abbosh et al. | |
| 2003/0156649 A1* | 8/2003 | Abrams, Jr. | 375/240.24 |
| 2003/0221014 A1* | 11/2003 | Kosiba et al. | 709/231 |
| 2003/0236840 A1 | 12/2003 | Hirooka | |
| 2004/0064500 A1 | 4/2004 | Kolar et al. | |
| 2004/0146284 A1* | 7/2004 | Kawate et al. | 386/96 |
| 2004/0230825 A1 | 11/2004 | Shepherd et al. | |
| 2004/0247284 A1 | 12/2004 | Yamasaki | |
| 2004/0255017 A1 | 12/2004 | Jurisch et al. | |
| 2004/0267821 A1 | 12/2004 | Kiyama et al. | |
| 2005/0015649 A1* | 1/2005 | Lee et al. | 714/5 |
| 2005/0021851 A1 | 1/2005 | Hamynen | |
| 2005/0025460 A1 | 2/2005 | Hyodo et al. | |
| 2005/0071491 A1 | 3/2005 | Seo | |
| 2005/0086315 A1 | 4/2005 | Malik et al. | |
| 2005/0102371 A1 | 5/2005 | Aksu | |
| 2005/0123136 A1 | 6/2005 | Shin et al. | |
| 2005/0138199 A1* | 6/2005 | Li et al. | 709/236 |
| 2005/0141420 A1* | 6/2005 | Li et al. | 370/230 |
| 2005/0198274 A1* | 9/2005 | Day | 709/224 |
| 2006/0007797 A1 | 1/2006 | Tsujimoto | |
| 2006/0013321 A1* | 1/2006 | Sekiguchi et al. | 375/240.27 |
| 2006/0034248 A1* | 2/2006 | Mishra et al. | 370/349 |
| 2006/0050697 A1* | 3/2006 | Li et al. | 370/389 |
| 2006/0053209 A1 | 3/2006 | Li | |
| 2006/0055798 A1 | 3/2006 | Kuwata | |
| 2006/0089949 A1 | 4/2006 | Robbin et al. | |
| 2006/0123052 A1 | 6/2006 | Robbin et al. | |
| 2006/0159366 A1 | 7/2006 | Darwish | |
| 2006/0195486 A1 | 8/2006 | Ohno et al. | |
| 2006/0224759 A1 | 10/2006 | Fang et al. | |
| 2006/0263065 A1 | 11/2006 | Akifusa | |
| 2006/0288119 A1* | 12/2006 | Kim et al. | 709/238 |
| 2006/0294183 A1 | 12/2006 | Agnoli et al. | |
| 2007/0005795 A1* | 1/2007 | Gonzalez | 709/232 |
| 2007/0011258 A1 | 1/2007 | Khoo | |
| 2007/0011501 A1* | 1/2007 | Yagawa | 714/701 |
| 2007/0016802 A1 | 1/2007 | Wingert et al. | |
| 2007/0143807 A1 | 6/2007 | Suneya | |
| 2007/0165998 A1 | 7/2007 | Tsujii et al. | |
| 2007/0168436 A1 | 7/2007 | Andam | |
| 2007/0260679 A1 | 11/2007 | Kikuchi et al. | |
| 2007/0279789 A1* | 12/2007 | Smith et al. | 360/53 |
| 2008/0065741 A1 | 3/2008 | Stratton et al. | |
| 2008/0083004 A1 | 4/2008 | Kim et al. | |
| 2008/0092189 A1 | 4/2008 | Baker et al. | |
| 2008/0107170 A1 | 5/2008 | Ong et al. | |
| 2008/0109556 A1 | 5/2008 | Karlberg | |
| 2008/0154798 A1* | 6/2008 | Valz | 705/400 |
| 2008/0162666 A1 | 7/2008 | Ebihara et al. | |
| 2008/0168516 A1* | 7/2008 | Flick et al. | 725/112 |
| 2008/0193098 A1 | 8/2008 | Hirabayashi et al. | |
| 2008/0208789 A1 | 8/2008 | Almog | |
| 2008/0250023 A1 | 10/2008 | Baker et al. | |
| 2009/0041430 A1 | 2/2009 | Ishizaka et al. | |
| 2009/0220206 A1* | 9/2009 | Kisliakov | 386/52 |
| 2010/0115346 A1 | 5/2010 | Lee | |
| 2011/0167345 A1* | 7/2011 | Jones et al. | 715/716 |

\* cited by examiner

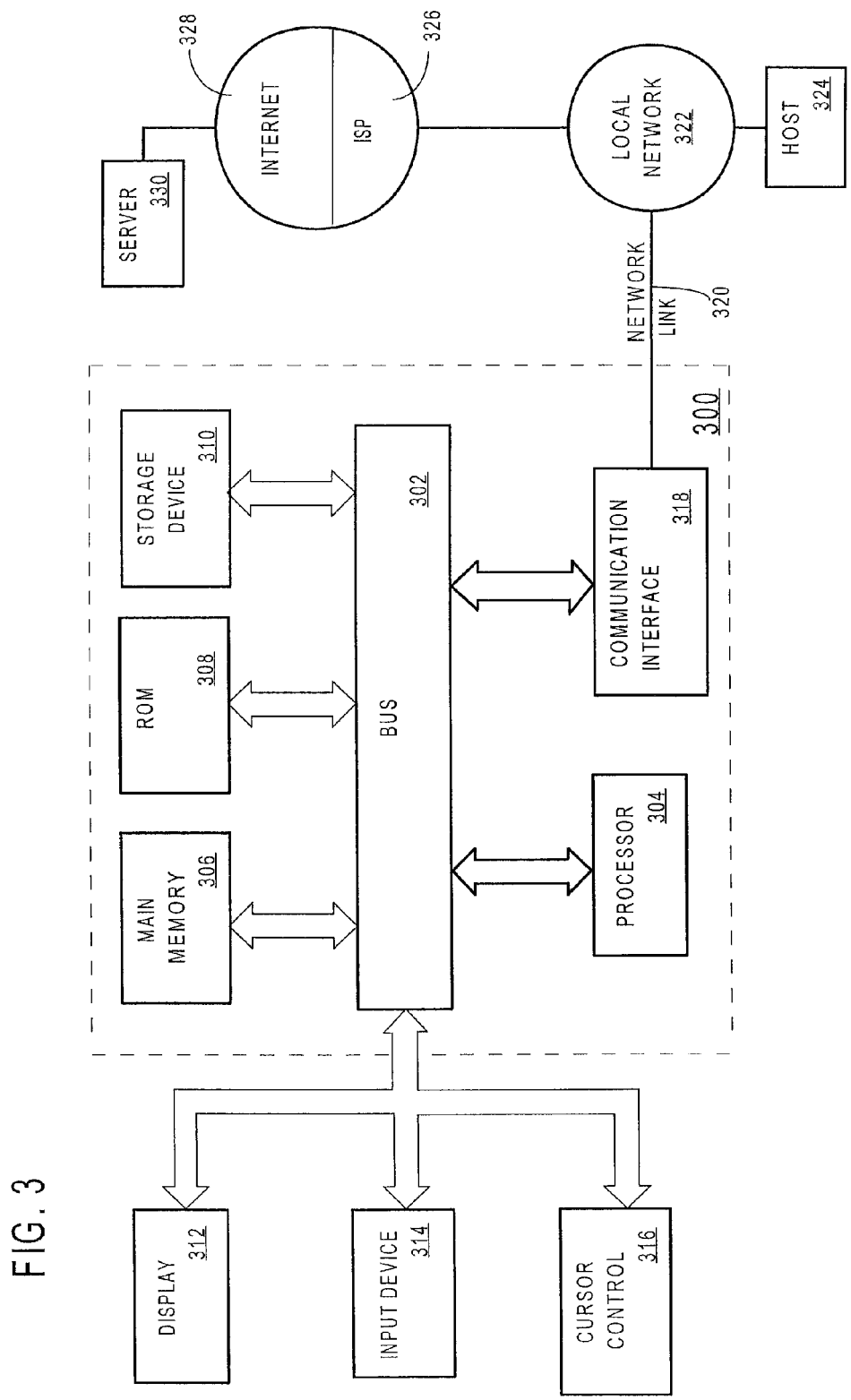

DETERMINING PLAYABILITY OF MEDIA FILES WITH MINIMAL DOWNLOADING

PRIORITY CLAIM

The present application is a continuation of U.S. application Ser. No. 12/143,119 filed on Jun. 20, 2008, which claims priority to provisional application No. 60/936,862 filed Jun. 22, 2007, the contents of which are incorporated herein in their entirety.

FIELD OF THE INVENTION

The present invention relates to informing users about media files located on the Web.

BACKGROUND

The Internet is a worldwide system of computer networks and is a public, self-sustaining facility that is accessible to tens of millions of people worldwide. The most widely used part of the Internet is the World Wide Web, often abbreviated "WWW" or simply referred to as "the Web." The Web organizes information through the use of hypermedia. The HyperText Markup Language ("HTML") is typically used to specify the contents and format of a hypermedia document (e.g., a web page).

A web page is the image or collection of images that is displayed to a user when the web page's HTML file is rendered by a browser application program. Each web page can contain embedded references to resources such as images, audio, video, documents, or other web pages. On the Web, the most common type of reference used to identify and locate resources is the Uniform Resource Locator, or URL. A user using a web browser can reach resources that are embedded in the web page being browsed by selecting "hyperlinks" or "links" on the web page that identify the resources through the resources' URLs.

Web pages frequently contain embedded references to media files, including audio and video files. Currently, there are two common ways in which such media files are accessed and played. In one way, a user using a web browser selects a link on a web page which leads to a media file and downloads the entire media file. After download is completed, the user accesses and plays the media file by using one of the media applications on the user's computer. Alternatively, when a web browser detects that there is a reference to a media file on a web page, the reference is automatically followed and downloading of the media file automatically begins. A plug-in application capable of playing the media file then automatically starts to play the media file within the web browser, either after completion of the download or as soon as enough data has been downloaded to initiate playing.

Media files are created in a variety of formats, however, and sometimes a media file cannot be accessed and played by any of the media applications or plug-in applications on the user's computer. In the current approaches, when a user or web browser downloads a media file, no attempt is made to check whether the media file is playable by one of the applications on the user's computer before attempting to download the entire media file. In the case that the media file is not playable by the user's computer, much time and bandwidth is lost in downloading data which is ultimately not useful to the user. If the user pays for Web communications on a per-byte basis, then downloading an unplayable media file incurs additional monetary loss for the user.

In the approach where a web browser automatically starts to play a media file when a portion of it has been downloaded, less time and money is wasted because an error will occur if the media file is not playable and this error frequently occurs before the entire media file has been downloaded. However, even under this approach, a significant amount of time and money may have already been expended in downloading the portion of the media file. This is because existing applications download the media file in a sequential fashion and do not limit the downloading to only the portion of the media file relevant for determining whether the media file is playable. Also, in the case where a user is paying for amount of data downloaded, he or she may wish to know whether a media file is playable before downloading commences.

To circumvent these problems, some web browsers currently perform a basic check to compare downloadable media files with a set of available applications. This check is performed by detecting information embedded in the web page or supplied by the server that describes a media file embedded in the web page. This information describes what application is capable of playing the embedded media file, or allows the web browser to find an application registered to play the embedded media file, and the web browser then checks if this application is installed on the computer. If the necessary application is not installed, then the media file is not downloaded and an error message is generated. This type of basic check, however, suffers from poor quality of information because information embedded in the web page is often wrong or insufficient.

In view of the foregoing, there is a need for a way to accurately detect and communicate to a user whether a media file embedded in a web page is playable on a device with minimal downloading of data about the media and without downloading the entire media file.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram of a computer system upon which embodiments of the invention may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Overview

Techniques are provided through which information about media files embedded in web pages is obtained from a server and analyzed to determine if the media files are playable on a device. Information is obtained from a server which also hosts the embedded media files. This information may be external to the media file or may be a portion of the media file itself. The determination of whether a media file is playable by a device is made based on information obtained from the server without downloading the entirety of the media file.

According to one technique, a request is sent to a server to obtain information about a media file's MIME type, which is a two-part identifier for file formats. The file format identified in the media file's MIME type is compared to a list of file formats which are known to be playable by a device. If there is a match, then the media file is determined to be playable by the device. Further information may be obtained and further analysis may be performed in the case that there is no match.

According to one technique, a request is sent to a server to obtain one or more portions of a media file. The portions of the media file which are obtained contain information about the media file's audio and video formats, including the coding and decoding schemes used to generate the media file's content. This information is analyzed with respect to the media applications and plug-ins installed on a device to determine whether the media file is playable by the device.

According to one technique, an indication of whether a media file embedded in a web page can be played on a device is displayed by a web browser on the web page. In addition, a user may choose to download the media file based on the indication of the media file's playability. Alternatively, a web browser may automatically commence downloading and/or playing the media file once it has been determined that the media file is playable by the device.

According to one technique, whether a media file embedded in a web page is playable by a device is determined asynchronously with respect to another process which requests the contents of the web page from the server.

According to one technique, the device is a mobile device which communicates with the server through wireless communications.

Using Information External to a Media File to Determine Playability

Figure 1A:
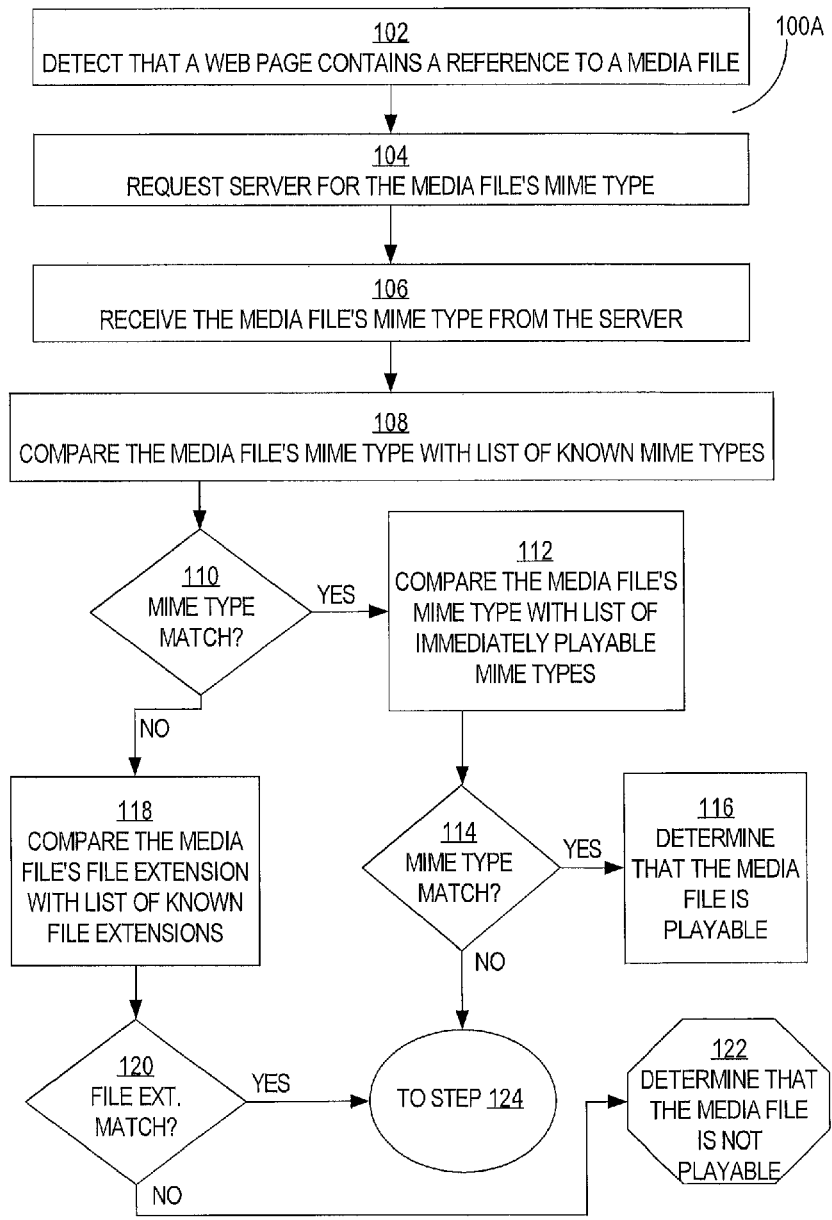
FIG. 1A is a flowchart illustrating an example procedure for determining whether a media file is playable on a device based on information external to the media file.
Figure 1B:
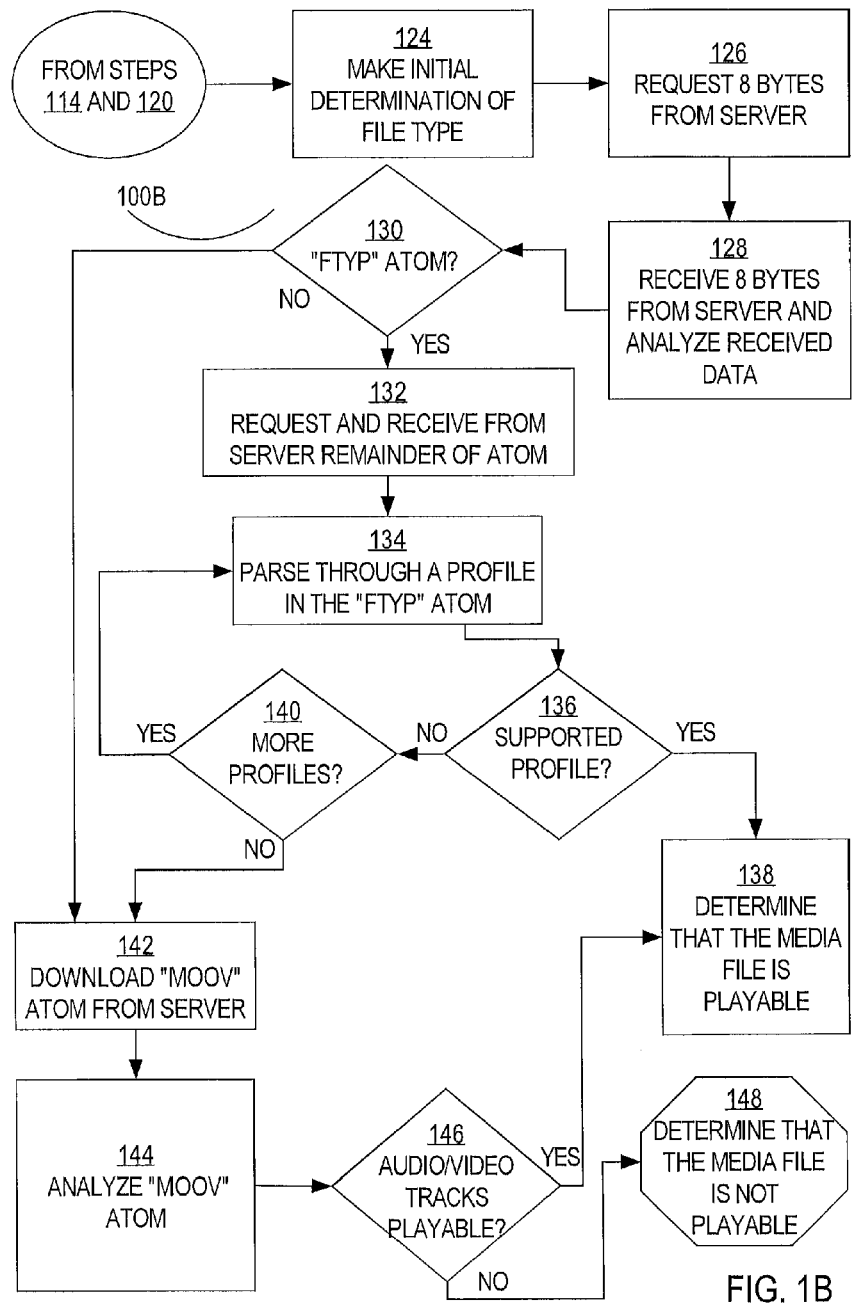
FIG. 1B is a flowchart illustrating an example procedure for determining whether a media file is playable on a device based on a portion of a media file.

FIGS. 1A and 1B are flow diagrams that illustrate an example of a technique for determining whether a media file embedded in a web page is playable by a device, according to an embodiment of the invention. The technique described is merely one embodiment of the invention. Although the steps in this embodiment are described below as being performed by the web browser application, in alternative embodiments of the invention, steps in the invention may be performed by a separate software application which interacts with the web browser or by a stand-alone application, such as an email application. The technique, or portions thereof, may be performed, for example, by one or more processes executing on a computer system such as that described below with reference to FIG. 3.

The flow diagram in FIG. 1A illustrates a process 100A in which information from a server external to the media file is used to make a determination of playability. If, based on this information, it cannot be determined definitely whether a media is playable or not, the steps illustrated in FIG. 1B may be performed in which a portion of the media file itself is analyzed to determine whether the media file is playable.

In block 102, a web browser detects that a web page contains an embedded reference to a media file. This may be done by examining the file extension of the file specified in an HREF attribute or EMBED element, or by examining the TYPE attribute of and EMBED or OBJECT element. A media file can be an audio file or video file. A video file may in turn contain both video and audio tracks.

Upon detection of an embedded media file, the web browser in block 104 sends a request to the server for the media file's MIME type. A MIME type is a two-part identifier for file formats. Examples of MIME types include "audio/mp3" (indicates that the file is an audio file in an MPEG-1 Audio Layer 3) and "video/mp4" (indicates that the file is a video file in the MPEG4 format). In block 106, the server returns the media file's MIME type to the web browser.

Next, in block 108, the web browser compares the media file's MIME type with a list of known MIME types. The list of known MIME types is specific to each device on which the web browser operates because whether a media file is playable by a device depends on what applications have been installed on the specific device. In block 110, the web browser determines if there is a match between the media file's MIME type and a MIME type listed in the list of known MIME types. If there is a match, then the media file may be playable by the device. Further steps are performed to determine if the media file is indeed playable by the device.

In block 112, the media file's MIME type is compared with a second list of MIME types which is a subset of the list of known MIME types. The second list consists of "immediately playable" MIME types. In block 114, if the web browser determines that that there is a match between the media file's MIME type and a MIME type in the list of "immediately playable" MIME types, then block 116 is reached and the web browser determines that the media file is playable by the device. In other words, the list of "immediately playable" MIME types contains all MIME types which are known to be definitely playable by the device. For example, in one embodiment, the MIME type "audio/mp3", which denotes an audio file in the MPEG3 format, is known to be playable by a device. Therefore, if a media file's MIME type is "audio/mp3", then the web browser determines that this media file is playable without further investigation.

On the other hand, if there is no match between the media file's MIME type and the list of "immediately playable" MIME types in block 114, then the web browser may need to perform further steps to determine whether the media file is playable on the device. These further steps commence with block 124 and are described in detail below with respect to FIG. 2A.

Going back to block 110, if there is no match between the media file's MIME type and the list of known MIME types, block 118 is performed. In block 118, the web browser compares the media file's file extension with a list of known file extensions. The file extension may be obtained from the path to the media file. Similar to the list of known MIME types, the list of known file extensions is specific to each device. The list of known file extensions contains all file extensions which may be played by a device. In block 120, if there is no match between the media file's file extension and a file extension in the list of known file extensions, then block 122 is reached and the web browser determines that this media file is not playable. On the other hand, if there is a match between the media file's extension and a file extension in the list of known file extensions, then the web browser may need to perform further steps to determine whether the media file is playable on the device. These further steps commence with block 124 and are described in detail below with respect to FIG. 2A.

Using Portions of a Media File to Determine Playability

As discussed above, if the web browser cannot determine whether a media file is playable by a device based on a media file's MIME type and file extension alone, then the web browser may request additional data from the server to perform further analysis. The flow diagram in FIG. 1B illustrates a process 100B in which portions of a media file is obtained from a server and are used to make a determination of playability.

In block 124, the web browser makes an initial determination, based on the media file's MIME type and file extension, regarding what kind of format is in the media file. For example, if the media file has a file extension of ".MP4", then the web browser determines that the media file is likely in a format in the MPEG4 family of formats. In another example, if the media file has an extension of ".MOV", then the web browser determines that the media file is likely in a format in the QuickTime family of formats. Based on this initial determination, the web browser requests the first eight bytes of the media file from the server in block 126.

Figure 2:
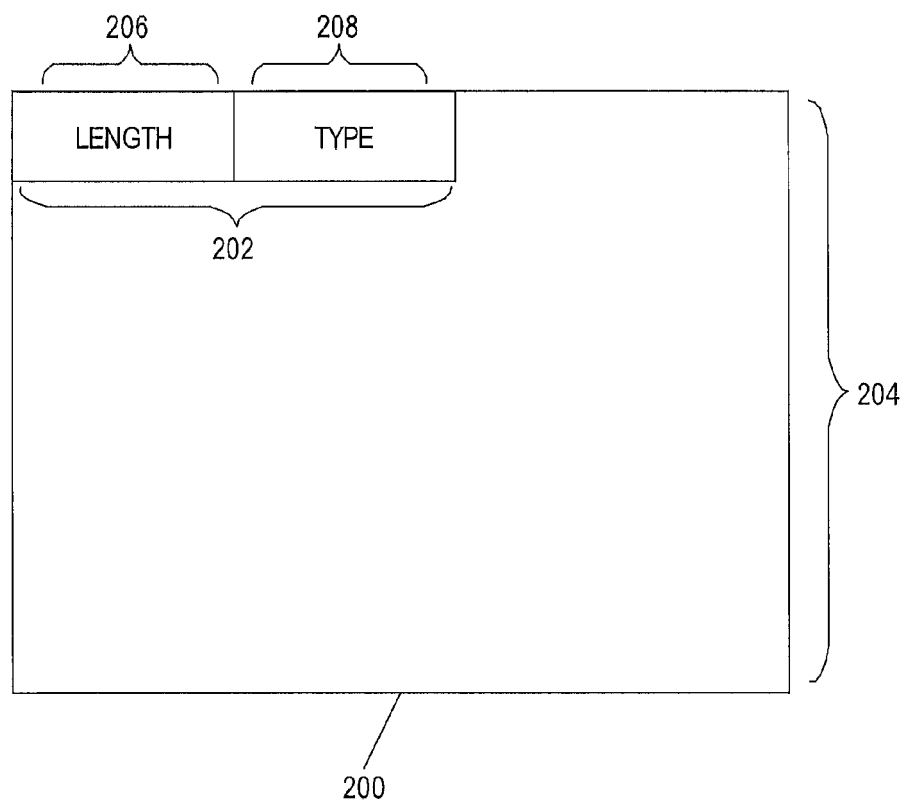
FIG. 2 is a depiction of an example of an atom in a MPEG4 media file.

When a media file is in the MPEG4 or QuickTime family of formats, the first eight bytes of the media file is the "header" of the first "atom" of the media file. FIG. 2 depicts an example of an "atom" in a media file. Atom 200 consists of a header 202 and content 204. The header is eight bytes long and consists of a length cell 206 and a type cell 208. Both the length cell 206 and the type cell 208 are four bytes long each. Length cell 206 contains length data, which indicates the length of content 204. Type cell 208 indicates what type of atom is atom 200. A media file in the MPEG4 or QuickTime family consists of a plurality of atoms, which all contain a header in its first eight bytes that indicates the length and type of atom.

One type of atom is the "moov" (movie) atom. The contents of a "moov" atom contains information about how the movie is encoded and a table of contents for the media file. Another type of atom is an "mdat" (movie data) atom. An "mdat" atom contains the video and/or audio data in the media file. A third type of atom is an "ftyp" (file type) atom. The "ftyp" atom identifies the format of the media file within the MPEG4 or QuickTime family. Significantly, atoms in a MPEG4 or QuickTime media file can be arranged in any order. That is, although a "moov" atom contains the table of contents for the media file, it may actually follow the "mdat" atom(s) of the media file. One exception is the "ftyp" atom. If a media file contains an "ftyp" atom, the "ftyp" atom is always the first atom located in the media file.

In block 128, the web browser receives the first eight bytes of the media file. As discussed above, these eight bytes constitute the header of the first atom of the media file. The web browser analyzes the header, specifically the type cell of the header, and determines whether the header is the header of an "flyp" atom. In block 130, if the header does not indicate an "flyp" atom, then the web browser downloads a "moov" atom from the server in block 142 in order to gather additional data about the media file. Block 142 is discussed in more detail below. If the header indicates an "flyp" atom, then in block 132, the web browser requests the server for the entirety of the "ftyp" atom in order to perform analysis on the contents of the "ftyp" atom.

The content of a media file's "ftyp" item contains a series of "profiles" from which the web browser can derive information about the format of the media file. Specifically, each profile contains information about what codec (coding and decoding) formats and bit rates are compatible with the audio and video data in the media file. An "ftyp" atom may contain more than one profile because the audio and video data in a media may be compatible with multiple coding formats and bit rates.

In block 134, the web browser parses through profiles in an "ftyp" atom one at a time to extract format information. In block 136, the web browser compares the extracted format information to information about what formats are supported, or playable, by a device. Information about what formats are supported by a device may be derived from what types of applications are installed on the device. Once again, this information is specific to each device. If the web browser determines that the profile is supported in that it indicates that a format compatible with the media file is supported, or playable, by the device, then the web browser determines in block 138 that the media file is playable by the device. In block 136, if the web browser determines that the profile is not supported, then further examination of the "ftyp" atom is performed.

In block 140, if the web browser detects that there are more profiles in the "ftyp" atom which have not been analyzed, block 134 is repeated. In block 134, the next profile is parsed and the format information contained in the profile is extracted. However, if the end of the "ftyp" atom has been reached and there are no more profiles to parse, then additional information is gathered by requesting and receiving data until the "moov" atom is received in block 142.

As FIG. 1B illustrates, the web browser requests and receives data until a "moov" atom has been received from the server in block 142 either when it has detected that the media file does not contain an "ftyp" atom (block 130) or when it has reached the end of an "ftyp" atom without detecting a supported profile (block 140). The request and receipt of atoms in block 142 is accomplished with minimal downloading of data from the server by taking advantage of the atom structure in the media file. As discussed above and illustrated in FIG. 2, each atom contains a header, and a header contains information about the length of the atom and the type of the atom. Therefore, the web browser may request the server for just eight bytes of header to determine whether an atom is a "moov" atom. Furthermore, the web browser need not download the entirety of an atom before it can request the header of the following atom. The web browser can calculate an offset value based on the length information contained in the header of an atom and send the offset value to the server to obtain the header of the following atom. In other words, the atom structure allows the web browser to request data from the server eight bytes at a time, skipping over lengthy contents while obtaining only the headers.

In block 144, the web browser receives the "moov" atom from the server and analyzes the "moov" atom for information about the media file's format. Sometimes, a "moov" atom may also be large and may contain several megabytes of data. Therefore, downloading an entire "moov" atom may also incur unwanted time and cost. A "moov" atom's content, however, is itself divided into "sub-atoms", where the header of each "sub-atom" indicates the length and type of "sub-atom". Consequently, in block 144, the web browser downloads only the headers of the "moov" atom's sub-atoms, skipping over irrelevant content until it detects a sub-atom which contains information about the media file's format. For example, the "moov" atom may contain sub-atoms which contain information about the media file's audio track and the media file's video track.

The web browser may extract information from the audio track and video track sub-atoms, and compares them to formats that are supported, or playable, by a device. For example, the video track sub-atom may indicate that the media file's video data has been compressed using "B-frames" (bi-directional frames), while the device does not have any applications which can play video data compressed into "B-frames". In this example, in block 146, the web browser determines that the video track is not supported by the device, and determines in block 148 that the media file is not playable by the device. In another example, the video track sub-atom may indicate that the media file's video data has been compressed using "I-frames" (intra frames), and the device does contain at least one application that can play video data compressed into "I-frames". In this example, if the audio track is similarly supported, in the block 146, the web browser determines that the audio and video tracks are playable and determines in block 138 that the media file is playable by the device.

Other Formats

Although an embodiment of the invention is described above in processes 100A and 100B (and FIGS. 1A and 1B) with respect to a specific flow diagram tailored to media files whose MIME types are maintained by a server and which belong in the MPEG4 or QuickTime family of formats, in alternative embodiments of the invention, processes 100A and 100B may be modified to perform similar analyses for media files with different formats.

User Interface

In one embodiment, once a web browser has determined that a media file is either playable or not playable, it may display this information to the user on the web browser screen. If the media file is playable, the web browser may further provide a selectable option for the user to download the media file for playing. Alternatively, the web browser may automatically download the media file and commence playing the media file. Finally, if the web browser determines that a media file is a video file, but that only one of the video file's audio and video tracks is playable, the web browser may display this detailed information to the user and provide a selectable option for the user to download the playable track for playing.

In another embodiment, the user may be informed of whether a media file is playable before any downloading commences. For example, the user may select an option where only the media file's MIME type is examined.

Asynchronous Operation

In one embodiment, the process of downloading information from the server and performing an analysis to determine whether a media file embedded in a web page is playable is performed asynchronously with respect to another process which downloads the contents of the web page. This asynchronous operation allows the web browser to load and display other contents of the web page for the user's viewing without waiting for the analysis on the embedded media file to finish. In one embodiment, when there are multiple media files embedded in the web page, a separate asynchronous process analyzes each media file.

Mobile Devices

In one embodiment, the device is a mobile device. Mobile devices, such as cellular phones, usually have less communication bandwidth and less storage capacity than wired devices, such as personal computers. Furthermore, users of mobile devices may be charged on a per-byte-downloaded basis. Therefore, it may be advantageous to inform users of mobile devices about whether a media file is playable without incurring the cost of downloading and storing an entire media file.

Hardware Overview

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising steps of:
    at a device, performing operations for:
        detecting that a web page contains a reference to a media file;
        in response to detecting that the web page contains the reference, requesting, from a server, information about the media file, wherein the information does not include an entirety of the media file, wherein requesting the information about the media file comprises requesting two or more headers from within an atom in the media file without requesting the entire atom of the media file;
        receiving the information from the server;
        determining, based on the information, whether the media file can be played by the device;
        requesting an entirety of the media file from the server in response to determining that the media file can be played by the device; and
        upon receiving the media file, playing the media file.

2. The method of claim 1, wherein:
    the two or more headers are separated by content in the atom of the media file that is not requested.

3. The method of claim 1, further comprising:
    displaying the web page on a screen on the device;
    wherein displaying the web page includes displaying an indication of whether the media file can be played by the device.

4. The method of claim 1, further comprising:
    in response to determining that the media file can be played by the device, displaying, on the web page, an option for downloading the media file from the server;
    receiving input that indicates whether the option has been selected by a user; and
    in response to receiving input that indicates that the option has been selected by the user, requesting a playable portion of the media file from the server.

5. The method of claim 1, wherein the steps are performed asynchronously with other steps that a process performs to request contents of the web page from the server.

6. The method of claim 1, wherein the device is a mobile device.

7. A computer-readable storage medium storing instructions, wherein the instructions include instructions which, when executed by one or more processors, cause the one or more processors to perform steps of:
- detecting that a web page contains a reference to a media file;
- in response to detecting that the web page contains the reference, requesting, from a server, information about the media file, wherein the information does not include an entirety of the media file, wherein requesting the information about the media file comprises requesting two or more headers from within an atom in the media file without requesting the entire atom of the media file;
- receiving the information from the server;
- determining, based on the information, whether the media file can be played by a device; and
- requesting an entirety of the media file from the server in response to determining that the media file can be played by the device.

8. The computer-readable storage medium of claim 7, wherein:
- the two or more headers are separated by content in the atom of the media file that is not requested.

9. The computer-readable storage medium of claim 7, wherein:
- the instructions further comprise instructions for displaying the web page on a screen on the device; and
- wherein the instructions for displaying the web page comprise instructions for displaying an indication of whether the media file can be played by the device.

10. The computer-readable storage medium of claim 7, wherein the instructions further comprise instructions for:
- in response to determining that the media file can be played by the device, displaying, on the web page, an option for downloading the media file from the server;
- receiving input that indicates whether the option has been selected by a user; and
- in response to receiving input that indicates that the option has been selected by the user, requesting a playable portion of the media file from the server.

11. The computer-readable storage medium of claim 7, wherein the steps are performed asynchronously with other steps that a process performs to request contents of the web page from the server.

12. The computer-readable storage medium of claim 7, wherein the device is a mobile device.

13. An apparatus, comprising:
- a processor; and
- a memory coupled to the processor;
- wherein the processor is configured to perform operations for:
  - detecting that a web page contains a reference to a media file;
  - in response to detecting that the web page contains the reference, requesting, from a server, information about the media file, wherein the information does not include an entirety of the media file, wherein requesting the information about the media file comprises requesting two or more headers from within an atom in the media file without requesting the entire atom of the media file;
  - receiving the information from the server;
  - determining, based on the information, whether the media file can be played by the processor; and
  - requesting an entirety of the media file from the server in response to determining that the media file can be played by the processor.

14. The method of claim 13, wherein the information about the media file comprises two or more separate portions of the media file.

* * * * *